C. H. HILL.
REMOVABLE AUTOMOBILE SEAT.
APPLICATION FILED JULY 31, 1915.
1,207,040.
Patented Dec. 5, 1916.
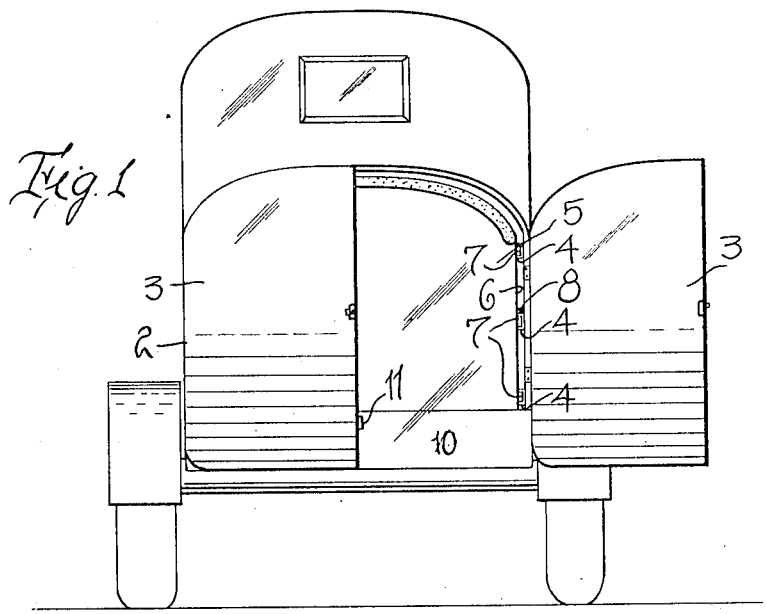
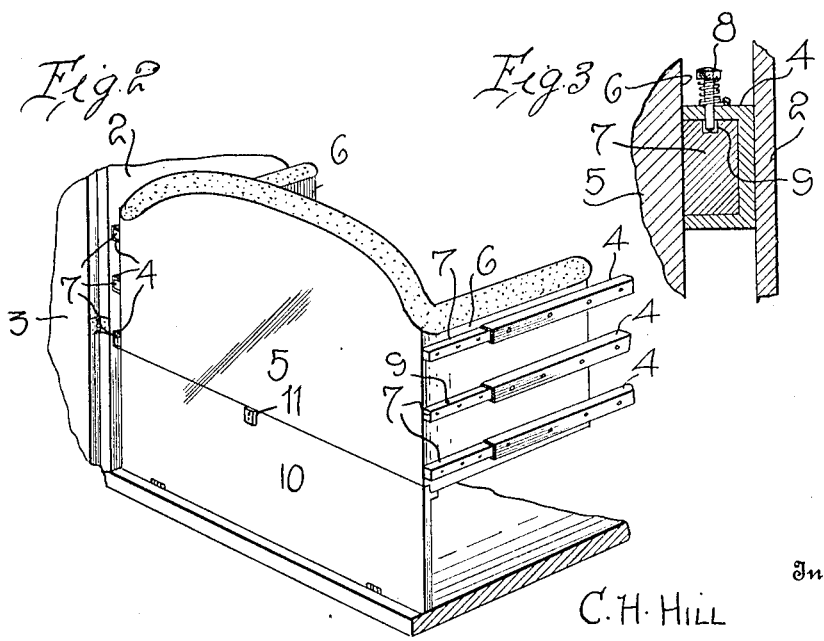
Inventor
C. H. Hill
By Watson E. Coleman
Attorney

UNITED STATES PATENT OFFICE.

CLYDE H. HILL, OF INDEPENDENCE, OREGON.

REMOVABLE AUTOMOBILE-SEAT.

1,207,040.

Specification of Letters Patent.

Patented Dec. 5, 1916.

Application filed July 31, 1915. Serial No. 42,930.

*To all whom it may concern:*

Be it known that I, CLYDE H. HILL, a citizen of the United States, residing at Independence, in the county of Polk and State of Oregon, have invented certain new and useful Improvements in Removable Automobile-Seats, of which the following is a specification, reference being had to the accompanying drawings.

My invention relates to automobiles, and particularly to the seating arrangements thereof, and the primary object of the invention is the provision, in connection with an automobile having a body adapted to be used for delivery or like purposes, of a seat adapted to be disposed within the body or removed therefrom.

A further object of my invention is to so construct the automobile that rear doors are provided which may be used normally for the disposition of parcels or the like within the automobile and which will also permit the introduction of a seat into the rear of the body, the arrangement of the body and the doors therefor being such as to provide an automobile capable of being used for two purposes and which will be stylish and be capable of having a strength and appearance such as given to the finest cars, and which, by removing the back seat, can be used for hauling, delivery, camping, etc.

A further object is to provide means for detachably holding the seat in place within the automobile body. Other objects will appear in the course of the following description.

My invention is illustrated in the accompanying drawings, wherein:

Figure 1 is a rear elevation of an automobile having rear doors and with the seat in place; Fig. 2 is a perspective view of a portion of the body of the car showing the manner in which the seat is supported; Fig. 3 is a detail sectional view of a portion of the seat, the supporting rib, the channel, and one side wall of the car to show the locking device.

Referring to these drawings, 2 designates the body of an automobile which has the shape of an ordinary delivery car. The rear end of the body is closed by oppositely disposed doors 3 which are hinged to the side walls of the body. These doors should be so arranged that when the doors are closed the joint between the doors and between the remainder of the body should be practically invisible. The side walls of the body 2 upon their inside faces are formed with channels or guides 4 which are illustrated as three in number on each side wall. Adapted to be detachably supported upon said guides is a seat designated generally 5, having a back, a bottom, and the side walls 6. These side walls are formed with a plurality of longitudinally extending ribs or tongues 7 which are adapted to engage in the channels 4 and support the seat. In order to prevent a longitudinal movement of the seat with relation to the body after the seat is in place, I mount upon one or both of the side walls of the body the spring actuated bolt 8 and form a perforation 9 in one of the ribs 7 into which this bolt engages. This bolt locks the seat in place within the car.

The bottom of the automobile may be provided with a hinged door 10 which will normally rest upon the bottom of the car but which may be turned upward into engagement with the rear end of a seat and latched therewith by a latch 11. Thus the space below the back seat may be used as a cupboard when the seat is used in the car and may form either the floor of the machine, or, if turned up, a back to the car bed.

It will be understood that while I have illustrated one seat as being removable from or insertible into the car body, that a plurality of seats may be so insertible, each of the seats being constructed as previously described. Of course the rearmost seat will have such form that it will conform to the shape of the doors 3 so as to fit closely against the back of the car and avoid waste of space.

Cars already built and provided with the rear doors may be readily equipped with my removable seat, and cars having a delivery body but without rear doors may be so constructed as to provide the rear doors and further provided with means for supporting the seat.

It is further to be noted that the channels 4 may be used not only for supporting one or more seats within the body of the car, but may also be used for the support of shelves, hangers, or other devices for supporting packages. Then by the removal of the shelves and the insertion of the seat the car is equipped for passenger use. While I have only illustrated one seat, it is to be understood that a number of seats might be so disposed within the body of the car, each seat engaging the flanges 4 and each seat being bolted or otherwise fastened in place. It is also to be understood that the door 10 for closing the space below the seat is to be so hinged that it may be turned outward to permit access to be had to the space beneath the seat, or when the seat is removed the door may be turned inward and disposed upon the bottom of the car. It is also obvious that the door 10 might be hinged or supported in a different manner and yet achieve the same object, that of closing the space below the seat so as to provide a receptacle or cupboard therein.

While I have shown a definite style of car, it will of course be understood that my invention might be applied to many different makes of business car.

Having thus described my invention, what I claim is:—

1. The combination with an automobile body having rear doors, the side walls of the body being formed with supporting U-shaped channel irons, of a seat having outwardly projecting ribs on each side engaging the said channel irons, and means for detachably locking one of said ribs to its corresponding channel iron.

2. The combination with an automobile body having rear doors, the side walls of the body being formed with supporting guide U-shaped channel irons, of a seat having outwardly projecting ribs on each side engaging said channel irons, and means for locking one of said ribs to its corresponding channel iron, said means including a spring pressed bolt mounted on the channel iron and projectable into a perforation in the rib.

3. The combination with an automobile body having rear laterally opening doors, the side walls of the body being formed with supporting guide channels, of a seat having outwardly projecting ribs on each side engaging said channels, the seat having a bottom and being supported with its bottom above the floor of the body, and a door closing the space between the bottom of the seat and the floor of the body.

4. The combination with an automobile body having rear laterally opening doors, the side walls of the body being formed with supporting guide channels, of a seat having outwardly projecting ribs on each side engaging between said channels, and a door so hinged to the floor of the body at its rear end that it may be turned downward upon the floor, or upward to close the space between the seat and the floor, or shifted outward to permit access to the space between the seat and floor, and means for latching the door in its vertical position.

In testimony whereof I hereunto affix my signature in the presence of two witnesses.

CLYDE H. HILL.

Witnesses:
B. F. SWOPE,
E. T. HENKLE.